United States Patent [19]

Nakagawa et al.

[11] 4,438,222
[45] Mar. 20, 1984

[54] HEAT RESISTANT EXPANDABLE PLASTIC PARTICLES AND MOLDED ARTICLES PRODUCED THEREFROM

[75] Inventors: Masao Nakagawa, Takasago; Tatehiko Nishida, Ibaraki, both of Japan

[73] Assignee: Kanegafuchi Chemical Industry Co., Ltd., Osaka, Japan

[21] Appl. No.: 458,053

[22] Filed: Jan. 14, 1983

Related U.S. Application Data

[63] Continuation of Ser. No. 299,201, Sep. 3, 1981, abandoned.

[30] Foreign Application Priority Data

Sep. 13, 1980 [JP] Japan ................................ 55-127624

[51] Int. Cl.$^3$ .............................................. C08J 9/18
[52] U.S. Cl. .................................... 521/60; 521/56; 521/57
[58] Field of Search ............................. 521/56, 60, 57

[56] References Cited

U.S. PATENT DOCUMENTS 4,017,427 4/1977 Granda et al. ..................... 521/60
4,036,794 7/1977 Keppler et al. ..................... 521/60

Primary Examiner—Morton Foelak
Attorney, Agent, or Firm—Wenderoth, Lind & Ponack

[57] ABSTRACT

This invention produces heat resistant expandable plastic particles by the method of emulsion polymerization, containing α-alkylstyrene 15–55 weight %, another polymerizable monomer 85–45 weight %, and a readily volatile blowing agent 3–15 weight % as chief ingredients, and offers the expandable plastic molded articles with high heat resistance and high dimensional stability produced by prefoaming the expandable polymerizate particles with heating at a pressure of more than 0.1 kg/cm$^2$G followed by heat-molding in a metallic mold.

5 Claims, 2 Drawing Figures

HEAT RESISTANT EXPANDABLE PLASTIC PARTICLES AND MOLDED ARTICLES PRODUCED THEREFROM

This application is a continuation of Ser. No. 299,201, filed Sept. 3, 1981, now abandoned.

BACKGROUND OF THE INVENTION

This invention is concerned with heat resistant and dimensionally stable expandable plastic particles and the molded articles produced from the expandable plastic particles. Expandable styrene particles and molded articles produced therefrom have been known. The particles are produced by making styrene monomer into a granular polymerizate by suspension polymerization followed by impregnating the granules with a readily volatile blowing agent.

For the production of foamed molded articles, there is a known method wherein expandable styrene particles containing a readily volatile blowing agent are prefoamed by heating with steam followed by heat-molding with steam in a mold which can be closed, but not closed too tightly. However, because the monomer constituting the polymer is styrene, the foamed molded article cannot be used either as heat insulation material for pipes used at relatively high temperature, or in any other field where heat resistance is required.

SUMMARY OF THE INVENTION

The inventors have studied to overcome the defects noted above in the conventional expandable plastic particles and molded articles therefrom. They have found that expandable polymer particles, which contain $\alpha$-alkyl styrene 15–55 weight % and another polymerizable monomer 85–45 weight % as the monomer components constituting the polymer, and a readily volatile blowing agent 3–15 weight %, as the chief ingredients, are highly heat resistant. They have also found that plastic foamed molded articles produced by prefoaming the expandable polymer particles with heat followed by heat-molding in a metallic mold which can be closed, but not too tightly, are highly heat resistant, and have thus completed this invention.

DETAILED DESCRIPTION OF THE INVENTION

Figure 1:
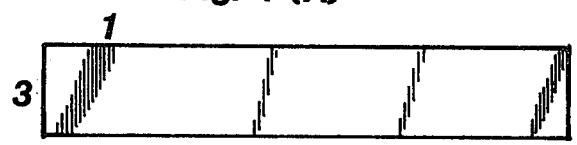
FIGS. 1 (A) and (B) show the dimensions of the metallic test mold used to make molded articles according to this invention. (A) and (B) show the sectional plane and the ground plane, respectively wherein:
1. internal width of the mold, 200 mm
2. internal length of the mold, 300 mm
3. internal depth of the mold, 20 mm
Figure 1:
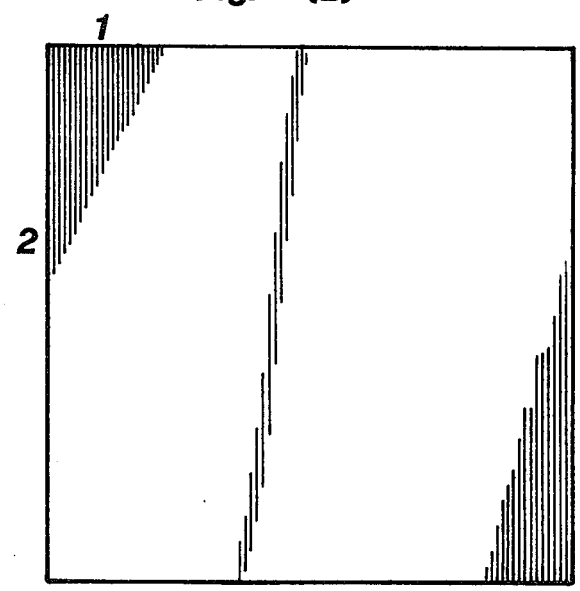

The composition of the monomer constituting the polymer used in this invention is $\alpha$-alkylstyrene 15–55 weight % and another polymerizable monomer 85–45 weight %, or, more preferably, $\alpha$-alkylstyrene 20–40 weight % and the other polymerizable monomer 80–60 weight %.

If the amount of $\alpha$-alkylstyrene is less than 15 weight %, practically useful improvement of heat resistance cannot be attained, and if the amount of $\alpha$-alkylstyrene is more than 55 weight %, the heat resistance of the plastics is so much elevated that foaming and molding become difficult. Because desirable heat resistance can practically be obtained with $\alpha$-alkylstyrene of less than 55 weight %, excess $\alpha$-alkylstyrene over 55 weight % is not necessary at all.

As $\alpha$-alkylstyrene, $\alpha$-methyl-, $\alpha$-ethyl-, $\alpha$-n-propyl-, and $\alpha$-iso-propyl-styrenes are used.

As the other polymerizable monomer, styrene alone, or a mixture of styrene with acrylonitrile, methylmethacrylate, n-butylacrylate, ethylacrylate, or 2-ethylhexylacrylate are used.

For the synthesis of the polymer from these monomers, emulsion polymerization is employed.

Emulsion polymerization may be performed according to the ordinary method. For example the mixture of the monomers described above is treated in an aqueous medium batchwise or continuously in the presence of a radical polymerization catalyst.

In this case, the manner of addition of the monomers is not particularly restricted; $\alpha$-alkylstyrene and the other polymerizable monomer may be added all at once or continuously, or only $\alpha$-alkylstyrene may be added initially all at once followed by continuous addition of the other polymerizable monomer. As the radical polymerization catalyst, peroxide, such as potassium persulfate, ammonium persulfate, and cumene hydroperoxide, is used. Polymerization accelerator, chain transfer agent, emulsifier etc. may be appropriately selected from those which have generally been used for emulsion polymerization.

The polymer latex obtained is allowed to coagulate by salting out according to the ordinary method, and dried to give powdery polymer.

The method to obtain expandable particles from the powdery polymer is as follows:

The powdery polymer is pelletized with an ordinary extruder and the resultant pellets are impregnated with blowing agent to give expandable particles.

The method to impregnate the pellets with blowing agent may be as follows:

water, dispersing agent, and the pellets are added to an autoclave followed by the addition of a fixed amount of blowing agent after the elevation of temperature, kept for a fixed time, cooled, and taken out.

The dispersing agent used here is a well-known dispersing agent such as polyvinyl alcohol, polyvinyl pyrrolidone, basic calcium phosphate, etc. When basic calcium phosphate is used as the dispersing agent, an anion surface active agent is also used.

The anion surface active agent is sodium salt of alkylbenzene sulfonic acid or sodium salt of $\alpha$-olefin sulfonic acid, etc.

The blowing agent is n-butane, iso-butane, n-pentane, iso-pentane, or petroleum ether, which are used alone or as a mixture.

The expandable particles may include 0.5–5.0 weight % of an additive, based on the weight of the polymer, to improve expansion capacity. The additive may be a solvent such as toluene, ethylbenzene, xylene, styrene, $\alpha$-methylstyrene etc., or a swelling agent such as cyclohexane, hexane, heptane, octane etc., or a plasticizer such as dimethyl phthalate, diethyl phthalate, dibutyl phthalate, dioctyl phthalate, butylbenzyl phthalate, dioctyladipate, etc. These solvents, swelling agents, and plasticizers may suitably be combined according to the objective use and property.

The degree of polymerization of the expandable polymer particles is restricted:

the specific viscosity, $\eta sp$, determined by viscometry (test condition: with Ostwald's viscometer, at the polymer concentration of 1% in toleune at $30° \pm 0.1°$ C.)

should be in the range of 0.6 to 1.7, or more preferably in the range of 0.8 to 1.4.

When ηsp is less than 0.6 or more than 1.7, not only is a good foamed state and good foamed molded article not obtained, but also good pellets cannot be obtained by extrusion-pelletization described above, especially when ηsp is less than 0.6.

Prefoaming by heating the expandable plastic particles containing a readily volatile blowing agent is carried out with steam at 0 kg/cm² G (about 100° C.) for ordinary expandable styrene particles but in this invention it is necessary to carry out prefoaming at a steam pressure of more than 0.1 kg/cm² G (about 102° C.). If the pressure is less than 0.1 kg/cm² G a product of high expansion rate is difficult to be obtained.

mined according to the method described below. The result is shown in Table 2.

A fixed volume of the expandable particles described above is taken into a measuring cylinder and the weight is measured. Then the expansion rate is expressed in the apparent volume (cc) measured by the measuring cylinder per 10 g of the plastics.

TABLE 1

| plastics | α-methyl styrene | styrene |
|---|---|---|
| A | 5 | 95 |
| B | 20 | 80 |
| C | 30 | 70 |
| D | 60 | 40 |

(All the figures are expressed in weight %)

TABLE 2

| | expansion rate (cc/10 g plastics) | | | | | | | | | | | |
|---|---|---|---|---|---|---|---|---|---|---|---|---|
| foaming pressure (kg/cm²G) | 0 | | | 0.1 | | | 0.2 | | | 0.3 | | |
| foaming time (minutes) | 1 | 2 | 3 | 1 | 2 | 3 | 1 | 2 | 3 | 1 | 2 | 3 |
| plastics A | — | 650 | 700 | 600 | 800 | — | 800 | — | — | — | — | — |
| B | — | 520 | 650 | 500 | 780 | — | — | 900 | — | 900 | — | — |
| C | — | 260 | 300 | — | 350 | 420 | — | 430 | 600 | 600 | 800 | — |
| D | — | 120 | 150 | — | 230 | 250 | — | 320 | 350 | 370 | 380 | 380 |

Molding with heating carried out with steam or a mixture of steam and air, and the highest pressure inside the mold during molding is more than 1.0 kg/cm² G. Good molded articles cannot be obtained if the pressure is less than 1.0 kg/cm² G.

The following examples illustrate this invention, without being limited thereto.

EXAMPLE 1

To a reactor equipped with stirrer, reflux condenser, nitrogen-feed pipe, thermometer, and metering pump, 250 part of water, 30 part of sodium palmitate, 0.0025 part of ferric sulfate hydrate, 0.01 part of ethylenediamine tetramide, and 0.4 part of sodium formaldehyde sulfoxylate were added and heated at 60 C in N₂ flow after removal of oxygen.

Then 100 part of monomer mixture of fixed composition (Table 1 shows the composition) containing 0.3 part of cumene hydroperoxide and 0.1 part of tertiary dodecylmercaptane as chain transfer agent was continuously added over 6 hours. When the addition was completed the mixture was stirred further for 1 hour at 60 C. The copolymer latex thus formed was allowed to coagulate with $CaCl_2$, heated so that the particles might cohere, dehydrated, washed and dried.

After drying, pellets of 1 mm in diameter and 3 mm long were obtained by 40 mm vent-type extruder.

Then to an autoclave with stirrer, 100 part of water, 0.5 part of calcium phosphate, 0.006 part of sodium α-olefin sulfonate and 112 part of the pellets were added and heated to 90° C. after replacement with nitrogen. When the temperature became 90° C., 9.0 part of butane was added as blowing agent, and then immediately the mixture was heated to 110° C.

After keeping at 110° C. for 6 hours the mixture was cooled to 40° C., dehydrated, dried and sieved, so that expandable plastics A–D (Table 1) were obtained.

The expandable plastics A–D thus obtained were foamed at a steam pressure (to be called foaming pressure hereafter) of 0 kg/cm², 0.1 kg/cm², 0.2 kg/cm², and 0.5 kg/cm² G and the expansion rate was deter- As shown in Table 2 the higher the content of α-methylstyrene, remarkably the lower the expansion rate; when 60 part of α-methylstyrene is contained, as in plastics D, a high rate can no longer be attained.

It was found that when the foaming pressure is 0 kg/cm² G the expansion rate is low and prefoamed particles of desirable expansion rate can be obtained only when the steam pressure is more than 0.1 kg/cm².

Also when α-ethylstyrene or α-n-propylstyrene or α-isopropylstyrene was used instead of α-methylstyrene, almost similar results were obtained.

As described above, good heat resistant expandable plastic particles and foamed plastic molded articles therefrom cannot be obtained unless the foaming pressure is higher than the pressure applied when only styrene was used as in the customary method.

EXAMPLE 2

Similarly to Example 1 except that 30 part of α-methylstyrene, 70 part of styrene and the amount of tertiary dodecyl mercaptane shown in Table 3 were used; expandable plastic particles E to H were obtained, for which the expansion rate was determined in a similar way to that in Example 1. The result is shown in Table 4.

The specific viscosity ηsp of the expandable plastic particles measured with Ostwald's viscometer at the polymer concentration of 1% in toluene at 30±0.1 C is also given in Table 4.

Also when α-ethylstyrene, or α-n-propylstyrene, or α-isopropylstyrene was used instead of α-methylstyrene, almost similar results were obtained.

TABLE 3

| plastics | chain transfer agent: tertiary dodecylmercaptane (part) |
|---|---|
| E | 0 |
| F | 0.05 |
| G | 0.075 |
| H | 0.50 |

TABLE 4

| foaming pressure (kg/cm² G) | 0 | | | 0.1 | | | 0.2 | | | 0.5 | | | |
|---|---|---|---|---|---|---|---|---|---|---|---|---|---|
| foaming time (minute) | 1 | 2 | 3 | 1 | 2 | 3 | 1 | 2 | 3 | 1 | 2 | 3 | γsp |
| plastics  E | — | 200 | 240 | — | 220 | 300 | — | 240 | 320 | 400 | 500 | — | 1,824 |
| F | — | 240 | 300 | — | 330 | 400 | — | 400 | 570 | 570 | 700 | — | 1,423 |
| G | — | 240 | 300 | — | 320 | 390 | — | 400 | 580 | 570 | 710 | — | 1,236 |
| H | — | 300 | 350 | — | 360 | — | — | 440 | — | 480 | sh* | — | 0.558 |

*sh = shrinked.

EXAMPLE 3

Similarly to Example 1 except that 30 part of α-methylstyrene and 70 part of styrene were used, emulsion polymerization was carried out, and to the latex after completion of the emulsion polymerization 0.5 part, 1.0 part, 2.0 part or 3.0 part of butylbenzylphthalate was added.

Then the mixture was further treated similarly to Example 1, and expandable polymer particles I–L were obtained. The expansion rate of the plastics thus obtained was measured in a similar way to that used in Example 1. The result is shown in Table 5.

Also when α-ethylstyrene, or α-n-propylstyrene, or α-isopropylstyrene was used instead of α-methylstyrene almost similar results were obtained.

TABLE 5

| plastics | | expansion rate (cc/10 g of plastics) | | | | | | | | | | | |
|---|---|---|---|---|---|---|---|---|---|---|---|---|---|
| | | 0(1) | | | 0.1(1) | | | 0.2(1) | | | 0.3(1) | | |
| | | 1(2) | 2(2) | 3(2) | 1(2) | 2(2) | 3(2) | 1(2) | 2(2) | 3(2) | 1(2) | 2(2) | 3(2) |
| I | 0.5(3) | — | 300 | 340 | — | 400 | — | — | 500 | — | 700 | — | — |
| J | 1.0(3) | — | 380 | 400 | — | 510 | — | — | 650 | — | 850 | sh* | — |
| K | 2.0(3) | — | 450 | 500 | — | 680 | — | — | 800 | — | — | — | — |
| L | 3.0(3) | — | 510 | 650 | 520 | 780 | — | — | 900 | — | — | — | — | where;
(1)foaming pressure (kg/cm² G)
(2)foaming time (minute)
(3)the amount of butylbenzylphthalate added (part)
*sh = shrinked.

EXAMPLE 4

Plastics A–L obtained in Example 1–3 were each prefoamed until the apparent rate became 40 times, kept for 24 hours, and molded with Pearl Star 90 molding machine (Toyo Machinery & Metal Co., Ltd.) The metallic mold used is shown in FIGS. 1 (A) and (B).

Molding conditions were metalic mold heating time of 5 sec., loading time of 10 sec., mold preheating time of 7 sec., two face heating time of 20 sec., supplementary heating time of 7.5 sec., one face heating pressure of 0.5 kg/cm², water-cooling time of 60 sec., and allowing to cool time of 180 sec. A two face heating pressure (pressure of heated steam supplied from both faces of the mold) was varied to 0.7 kg/cm², 0.8 kg/cm², 1.0 kg/cm², 1.2 kg/cm², and 1.4 kg/cm².

Molded articles thus obtained were evaluated for their state of surface and inner bonding.

Here inner bonding means the degree of adhesion of particles when the molded article was broken, and is expressed in the ratio of the number of particles broken inside on the broken surface to the whole number of particles on the surface.

That is, when a molded article is broken, the inner bonding rate is defined as 0% if the destruction occurs only in the space between particles, and the rate is defined as 100% if the destruction occurs only inside the particles. The state of the surface is evaluated as follows:

(1) Whether the space between particles on the surface of the molded article is filled up by molding.
(2) The degree of fusion of the plastics on the surface of the molded article.

The more the space between particles of the molded article is filled up, and the lower the degree of fusion of the plastics on the molded article surface the better the state of the surface. The result is shown in Table 6.

TABLE 6

| | molding pressure (kg/cm²) | | | | | | | | | |
|---|---|---|---|---|---|---|---|---|---|---|
| | 0.7 | | 0.8 | | 1.0 | | 1.2 | | 1.4 | |
| plastics | (1) S.S. | (2) I.B. (%) | (1) S.S. | (2) I.B. (%) | (1) S.S. | (2) I.B. (%) | (1) S.S. | (2) I.B. (%) | (1) S.S. | (2) I.B. (%) |
| A | O | 90 | O | 90< | O | 90< | Om | 90< | — | — |
| B | X | 20 | Δ-O | 50 | O | 90< | O | 90< | O | 90< |
| C | X | 0 | X | 0 | Δ-X | 10 | O | 80 | O | 90< |
| D | X | 0 | X | 0 | X | 0 | Δ-X | 10 | Δ-X | 20 |
| E | X | 0 | X | 0 | X | 0 | Δ-X | 10 | Δ-X | 30 |
| F | X | 0 | X | 0 | X-Δ | 20 | Δ-O | 50 | O | 90 |
| G | X | 0 | X | 0 | Δ-X | 30 | O | 80 | O | 90< |
| H | Xsh | 90< | Xsh | 90< | Xsh | 90 | Xsh | 90< | Xsh | 90< |
| I | X | 0 | X-Δ | 10 | O-Δ | 70 | O | 90< | O-Δ | 90< |
| J | X | 10 | X-Δ | 30 | O-Δ | 70 | O | 90< | O-Δ | 90< |
| K | Δ | 50 | O | 90< | O | 90< | O | 90< | O-Δ | 90< |

TABLE 6-continued

| | molding pressure (kg/cm²) | | | | | | | | | |
|---|---|---|---|---|---|---|---|---|---|---|
| | 0.7 | | 0.8 | | 1.0 | | 1.2 | | 1.4 | |
| plastics | (1) S.S. | (2) I.B. (%) | (1) S.S. | (2) I.B. (%) | (1) S.S. | (2) I.B. (%) | (1) S.S. | (2) I.B. (%) | (1) S.S. | (2) I.B. (%) |
| L | O | 80 | O | 90< | O | 90< | O | 90< | Δm | 90< |

"(1) S.S." means the degree of melting of polymer on the surface of the shaped article (abbreviated as state of surface i.e. S.S.)
"(2) I.B." means inner bonding rate.
"sh" means the molded article shrank
"m" means the surface of the molded article was slightly melted.
O: good
Δ: slightly bad
X: bad
"90" means 90% <.

EXAMPLE 5

Heat resistance test was performed on the molded articles which were good in the state of the surface and showed high inner bonding rate among the molded articles A to L obtained in Example 4.

Heat resistance test was performed with uniform heating dryer manufactured by Tabai Co., Ltd.: the molded article was continuously heated at 90° C. or at 100° C. for 168 hours, and then the change (%) in the maximal size (length) of the molded article was determined.

The result is shown in Table 7.

TABLE 7

| | (contraction rate of molded article) | |
|---|---|---|
| | heat resistance test at | |
| plastics | 90° C. (%) | 100° C. (%) |
| A | +4.2 | −12 |
| B | −0.2 | −3.2 |
| C | 0 | −0.9 |
| F | 0 | −1.0 |
| G | 0 | −1.1 |
| I | 0 | −1.2 |
| J | −0.1 | −2.1 |
| K | −0.3 | −3.5 |
| L | −0.9 | −0.5 |

The Examples described above show that good heat-resistant expandable particles and their molded article can be obtained by this invention.

We claim:

1. A process for producing heat resistant, expandable plastic particles, which comprises subjecting a mixture containing 15–55 weight % of an α-alkylstyrene selected from the group consisting of α-methystyrene, α-ethylstyrene, α-n-propylstyrene and α-iso-propylstyrene and 45–85 weight % of another monomer polymerizable with the α-alkylstyrene, to emulsion polymerization in an aqueous medium in the presence of an emulsifying agent and a radical polymerization catalyst to obtain a polymer latex; separating and drying the polymer latex to obtain a powdery polymer; pelletizing the powdery polymer; and incorporating 3–15 weight % of a volatile blowing agent in the polymer pellets.

2. A process according to claim 1, wherein pelletization of the powdery polymer is conducted by heat extrusion.

3. A process according to claim 1, wherein the polymerization is completed by continuously adding the α-alkylstyrene, in which the polymerization catalyst, optionally with a chain transfer agent, is dissolved, and the other polymerizable monomer, into a reaction vessel which contains water, emulsifying agent and promoter.

4. A process according to claim 1, wherein the polymerization is completed by adding at one time the α-alkylstyrene, in which the polymerization catalyst, optionally with a chain transfer agent, is dissolved, and the other polymerizable monomer, into a reaction vessel which contains water, emulsifying agent and promoter.

5. A process according to claim 1, wherein the polymerization is completed by continuously adding the other polymerizable monomer, in which the polymerization catalyst, optionally with a chain transfer agent, is dissolved, into a reaction vessel which contains the α-alkylstyrene, water, emulsifying agent and promoter.

* * * * *